United States Patent
Schambre et al.

[11] Patent Number: 5,957,346
[45] Date of Patent: *Sep. 28, 1999

[54] SPARE TIRE STOWAGE SYSTEM FOR SPORT UTILITY VEHICLE

[75] Inventors: John Schambre, Canton; Liliana Neag, Commerce Township; Raymond C. Deyonker, Wixom; Karl M. Lindh; David L. Garber, both of Canton, all of Mich.

[73] Assignee: Chrysler Corporation, Auburn Hills, Mich.

[ * ] Notice: This patent issued on a continued prosecution application filed under 37 CFR 1.53(d), and is subject to the twenty year patent term provisions of 35 U.S.C. 154(a)(2).

[21] Appl. No.: 08/833,565

[22] Filed: Apr. 7, 1997

[51] Int. Cl.⁶ .......................... B62D 43/02; B62D 43/04
[52] U.S. Cl. ................................ 224/42.21; 224/42.12; 224/42.23; 224/496; 224/504; 224/505; 224/510; 414/466
[58] Field of Search ..................... 224/281, 282, 224/495, 496, 502–510, 42.12, 42.13, 42.21, 42.23, 42.24, 42.27, 42.28, 42.29; 296/37.2; 414/462, 465, 466, 463

[56] References Cited

U.S. PATENT DOCUMENTS

| | | | |
|---|---|---|---|
| 1,974,599 | 9/1934 | Bradford | 224/42.21 |
| 2,354,943 | 8/1944 | Clark | 224/42.24 |
| 2,378,911 | 6/1945 | Clark | 414/465 |
| 2,399,207 | 4/1946 | Clark | 414/465 |
| 2,494,411 | 1/1950 | Simi | 414/465 |
| 2,574,465 | 11/1951 | Clark | 414/465 |
| 2,631,764 | 3/1953 | Brown | 224/42.23 |
| 3,012,685 | 12/1961 | Toyama | 414/466 |
| 3,682,360 | 8/1972 | Fletcher et al. | 224/42.23 |
| 3,785,518 | 1/1974 | Johnson | 414/466 |
| 4,676,415 | 6/1987 | Kennedy | 224/496 |

FOREIGN PATENT DOCUMENTS

| | | | |
|---|---|---|---|
| 583459 | 10/1924 | France | 224/42.13 |
| 643181 | 5/1928 | France | 224/42.24 |
| 988712 | 8/1951 | France | 224/42.21 |
| 2378667 | 9/1978 | France | 224/42.21 |
| 1630948 | 2/1991 | U.S.S.R. | 224/42.23 |
| 24556 | of 1910 | United Kingdom | 224/42.29 |
| 289741 | 5/1928 | United Kingdom | 224/42.21 |

*Primary Examiner*—Gregory M. Vidovich
*Attorney, Agent, or Firm*—William J. Coughlin

[57] ABSTRACT

A system for stowing a spare tire on the exterior of a sport utility vehicle includes a carrier that holds the spare tire and that can pivoted between a highway configuration, wherein the spare tire is positioned beneath the chassis to thereby provide unimpeded access to the vehicle's rear lift door, and an off-road configuration, wherein the tire is positioned against the rear lift door, to thereby provide ample clearance beneath the vehicle.

9 Claims, 3 Drawing Sheets

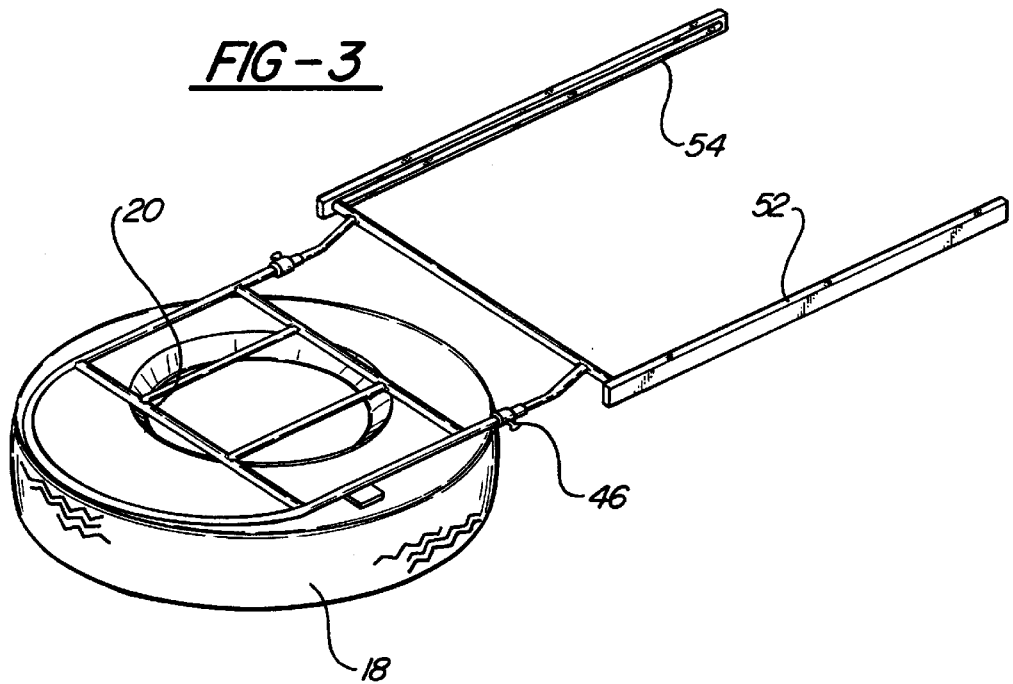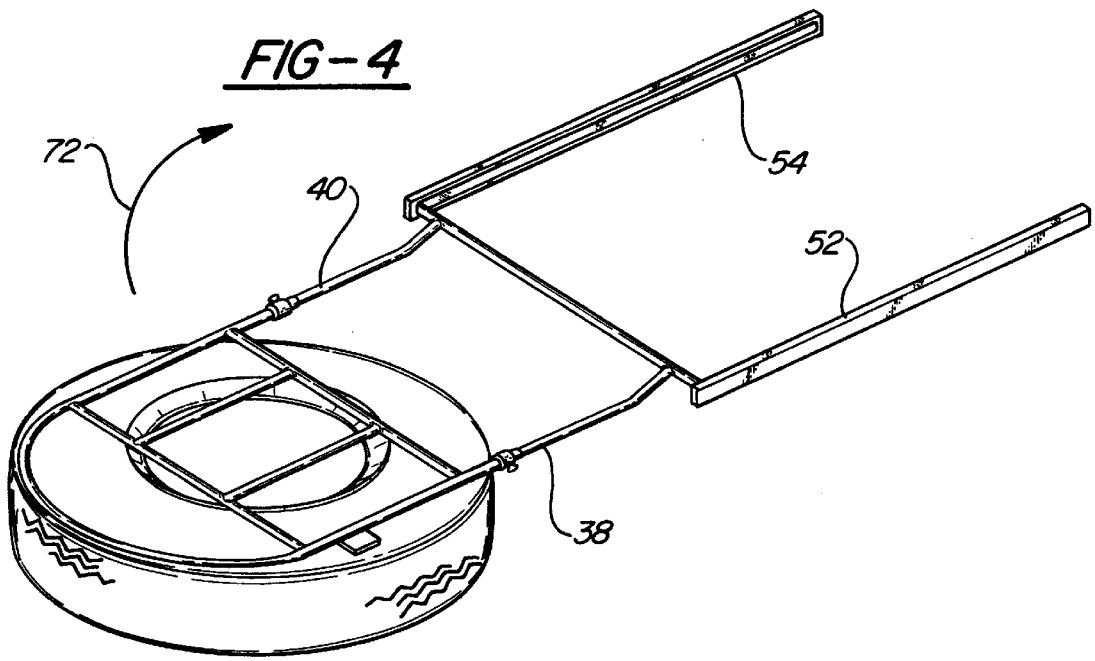

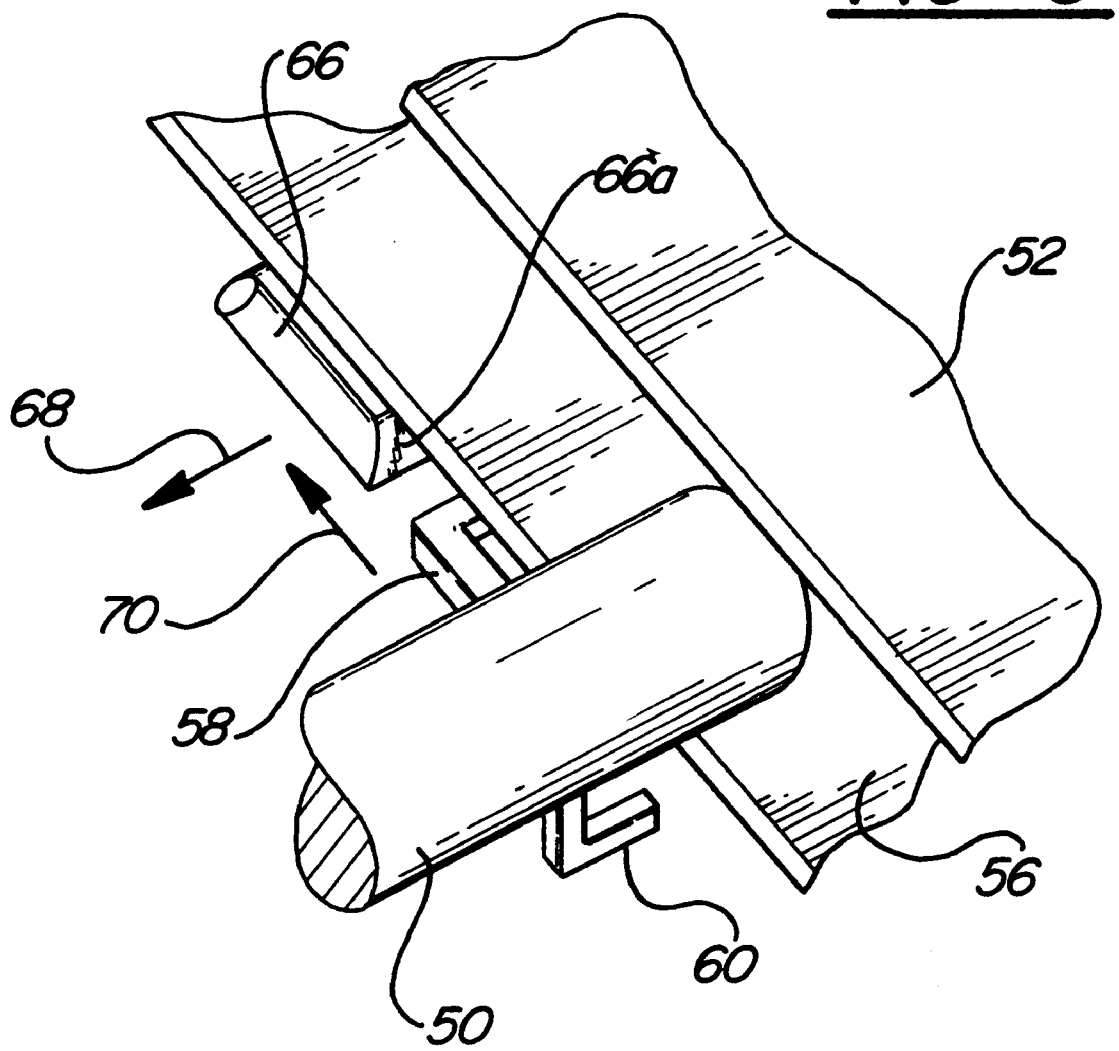

5,957,346

SPARE TIRE STOWAGE SYSTEM FOR SPORT UTILITY VEHICLE

FIELD OF INVENTION

The present invention relates generally to sport utility vehicles, and more particularly to methods and apparatus for stowing spare tires on sport utility vehicles.

BACKGROUND OF THE INVENTION

Spare tires are typically stowed in sport utility vehicles outside of the vehicle, on the rear lift gate of the vehicle, to avoid encumbering otherwise useful space within the vehicle. To permit operation of the rear lift gate, a sport utility vehicle's spare tire ordinarily is supported by a carrier that can be pivoted away from the lift gate to thereby allow access to the interior of the vehicle through the lift gate opening.

While effective, such spare tire stowage systems can be inconvenient, in that the user is required to pivot the carrier each time access is desired through the lift gate opening. Nevertheless, it remains desirable to avoid stowage of spare tires in the useful cargo space of the vehicle.

Accordingly, the present invention recognizes that a spare tire for a sport utility vehicle might be stowable beneath the vehicle's chassis. As further recognized herein, however, it would be desirable to provide an alternate stowage configuration for the spare tire. Specifically, it would be desirable to provide an alternate configuration in which to stow the tire, i.e., in a configuration other than beneath the chassis, when the vehicle is to be driven off-road. Thereby, adequate ground clearance is assured. As still further recognized herein, the desired spare tire stowage configuration should be easy to establish and to change to the alternate configuration.

Accordingly, it is an object of the present invention to provide a method and apparatus for stowing a spare tire on a sport utility vehicle. Another object of the present invention is to provide a method and apparatus for stowing a spare tire on a sport utility vehicle which permits the tire to be selectively stowed in more than one stowage configuration. Still another object of the present invention is to provide a method and apparatus for stowing a spare tire on a sport utility vehicle which is easy to use and cost-effective.

SUMMARY OF THE INVENTION

A system for stowing a spare tire on a sport utility vehicle that has a chassis and a rear lift gate includes a carrier configured for holding the tire. In accordance with the present invention, the carrier is selectively movable between a highway configuration, wherein the tire is positioned beneath the chassis, and an off-road configuration, wherein the tire is juxtaposed with the rear lift gate.

Preferably, the tire defines an axis and a tire plane perpendicular to the axis, and the carrier includes a holder for holding the tire. As disclosed in detail below, the holder is pivotably connected to the vehicle such that the carrier can be moved between the off-road configuration, wherein the tire plane is perpendicular to the ground and parallel to and juxtaposed with the rear lift gate, and an intermediate configuration, wherein the tire plane is parallel to the ground and below the rear lift gate. The carrier is then slid between the intermediate and highway configurations.

In one preferred embodiment, the carrier includes a guide rail which is attached to the vehicle beneath the chassis. In this embodiment, the holder is slidably engaged with the guide rail for moving the carrier from the intermediate configuration to the highway configuration. The holder includes opposed telescoping arms. In another preferred embodiment, the carrier is pivotably engaged with the vehicle for pivoting the holder between the intermediate and highway configurations. The carrier advantageously includes means for releasably holding the carrier in the off-road and highway configurations.

In another aspect, a vehicle includes a chassis, a rear lift gate, and a spare tire movably engaged with the chassis. The spare tire can be moved between an off-road configuration, wherein the spare tire is juxtaposed with the rear lift gate, and a highway configuration, wherein the spare tire is positioned beneath the chassis.

In still another aspect, a method is disclosed for stowing a spare tire on a sport utility vehicle having a chassis and a rear lift gate. The method includes attaching the tire to a carrier, and movably engaging the carrier with the vehicle between a highway configuration, wherein the tire is positioned beneath the chassis, and an off-road configuration, wherein the tire is juxtaposed with the rear lift gate.

The details of the present invention, both as to its structure and operation, can best be understood in reference to the accompanying drawings, in which like reference numerals refer to like parts, and in which:

BRIEF DESCRIPTION OF THE DRAWINGS

FIG. 3 is a perspective view of the spare tire stowage system with the carrier in the intermediate configuration;

FIG. 4 is a perspective view of the spare tire stowage system with the carrier in the intermediate configuration and with the arms of the holder telescoped; and FIG. 5 is a detailed view showing the mechanical stops of the carrier and showing a latch for holding the carrier in the highway configuration.

DETAILED DESCRIPTION OF THE PREFERRED EMBODIMENT

Figure 1:
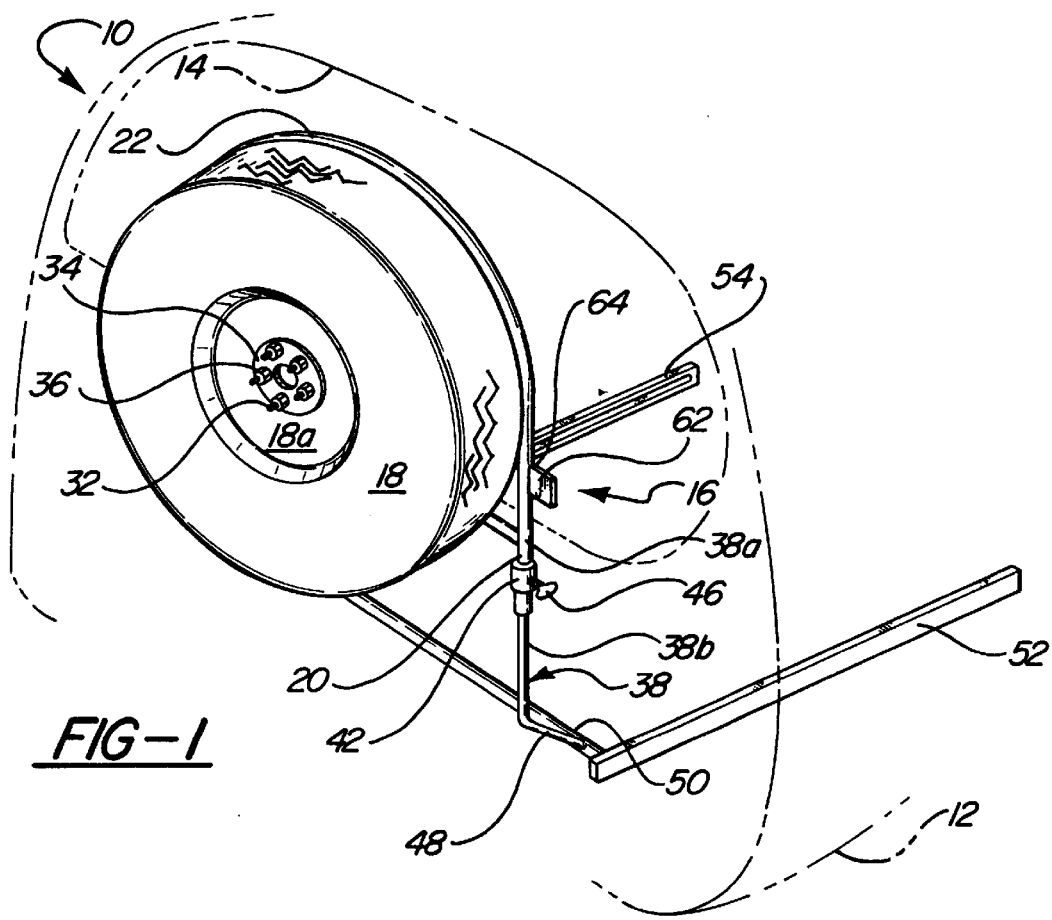
FIG. 1 is a perspective view of the spare tire stowage system of the present invention, with the carrier in the off-road configuration and with portions of a vehicle with which the system is engaged shown in phantom.
Figure 2:
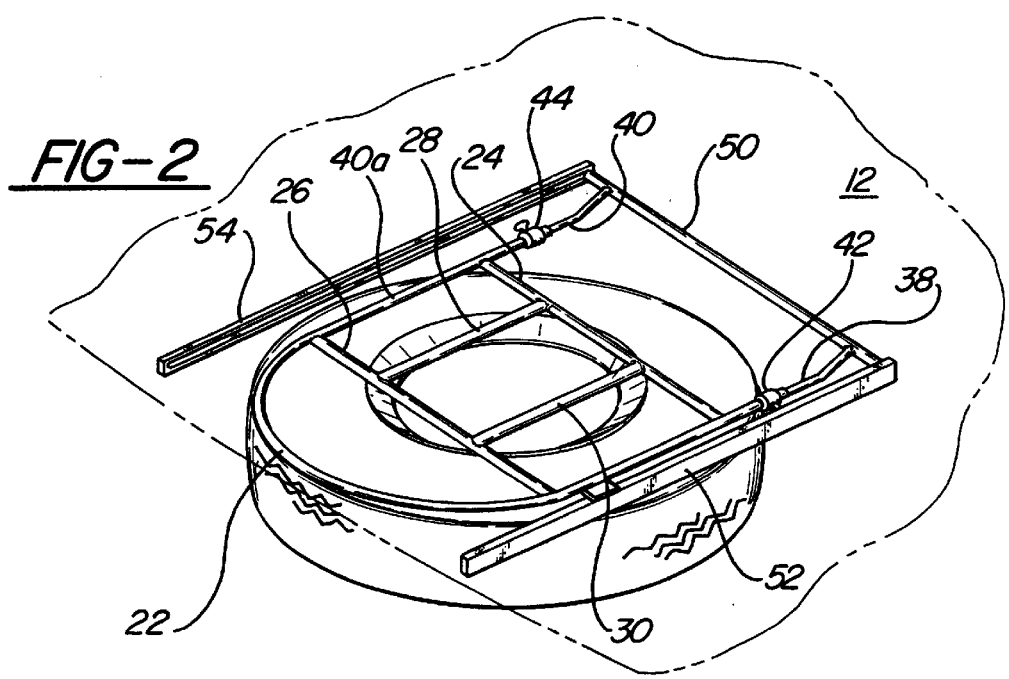
FIG. 2 is a perspective view of the spare tire stowage system with the carrier in the highway configuration and with portions of a vehicle with which the system is engaged shown in phantom.

Referring initially to FIGS. 1 and 2, a vehicle is shown, generally designated 10, which includes a chassis 12 and a rear lift gate 14. Preferably, the vehicle 10 is a sport utility vehicle which includes a spare tire carrier, generally designated 16, of the present invention. As disclosed in detail herein, the spare tire carrier 16 is configured for holding a spare tire 18 between a highway configuration (FIG. 2), wherein the tire 18 is positioned beneath the chassis 12, and an off-road configuration, wherein the tire 18 is juxtaposed with the rear lift gate 14 (FIG. 1).

In the highway configuration, access to the rear lift gate 14 is unimpeded; in the off-road configuration, the underbody clearance of the vehicle 10 is maximized. As used herein, "spare tire" includes both the tire proper and the rim on which it is mounted.

In cross-reference to FIGS. 1 and 2, the carrier 16 includes a holder 20 for holding the tire 18 perpendicular to the ground in the off-road configuration (FIG. 1). Also, the holder 20 is pivotably connected to the vehicle 10 such that the tire 18 can be held underneath the vehicle 10, parallel to the ground, in the highway configuration. In the presently preferred embodiment, the holder 20 includes a rigid metal U-shaped frame 22 that is welded to two transverse rigid metal cross-members 24, 26. Two longitudinal rigid metal cross-members 28, 30 are welded to each of the transverse cross-members 24, 26 as best shown in FIG. 2.

Per the present invention, the holder 20 firmly yet releasably holds the tire 18 in accordance with clamping methods known in the art. For example, a post 32 (FIG. 1) can be provided on the holder 20, and the post 32 can extend through the middle of the tire 18 such that a clamp 34 can be held against the rim 18a of the tire 18 by a nut 36 that threadably engages the post 32. It is noted that this structure is only shown in FIG. 1 for clarity of the remaining figures.

Additionally, FIG. 1 best shows that the frame 22 includes opposed straight telescoping arms 38, 40. A respective fitting 42, 44 surrounds an outer segment 38a, 40a of each arm 38, 40, and a respective inner segment (only the segment 38b shown in FIG. 1) is reciprocatingly engaged with the respective fitting 42, 44. A respective thumbscrew (only the thumbscrew 46 shown in FIG. 1) is threadably engaged with each fitting 42, 44, and the thumbscrews can be tightened to abut the inner segments 38b, 40b and thereby hold the inner segments 38b, 40b stationary relative to the outer segments 38a, 40a. Also, the thumbscrews 46 can be loosened to permit the inner segments 38b, 40b to reciprocate within the outer segments 38a, 40a and thereby telescope the arms 38, 40. Alternatively, the thumbscrews 46 need not be threaded, but can instead be spring-loaded to urge inwardly against the inner segments 38b, 40b.

Still referring to FIG. 1, both inner segments 38a include respective lower dogleg segments (only the dogleg segment 48 shown in FIG. 1) that terminate in a rigid metal transversely-oriented hinge bar 50. The opposed ends of the hinge bar 50 are slidably received in respective rigid metal right and left guide rails 52, 54, each of which guide rail 52, 54 is fixedly attached to the underbody of the vehicle 10 by means well-known in the art, e.g., by bolting or welding.

Referring briefly to FIG. 5, and taking the right guide rail 52 as an example, the right guide rail 52 is formed with a channel 56 for slidably receiving the hinge bar 50 therein. Mechanical stops 58, 60 are attached to the hinge bar 50 to limit the hinged motion of the holder 20 relative to the guide rails 52, 54. In one preferred embodiment, the stops 58, 60 are L-shaped, and they are spaced 90° apart from each other relative to the bar 50.

The first stop 58 contacts the guide rail 52 to prevent hinged motion of the carrier 16 past the highway configuration shown in FIG. 2. In contrast, the second stop 60 contacts the guide rail 52 to prevent hinged motion of the carrier 16 past the off-road configuration shown in FIG. 1. It is to be understood that additional stops (not shown) can be provided to engage the left guide rail 54.

Still referring to FIGS. 1 and 2, the carrier 16 can be held in the off-road configuration (FIG. 1) by a spring-loaded liftgate latch 62 that is hingedly attached to the vehicle 10 by means well-known in the art. Specifically, the liftgate latch 62 cooperates with a catch 64 on the holder 20 to hold the carrier 16 in the off-road configuration shown in FIG. 1.

Likewise, the carrier 16 can be held in the highway configuration (FIGS. 2 and 5) by a spring-loaded underbody latch 66. The underbody latch 66 is hingedly connected to the chassis 12 of the vehicle 12. If desired, the underbody latch 66 is biased in a direction opposite to that indicated by the arrow 68. Preferably, the latch 66 includes a ramp surface 66a, and when structure on the hinge bar 50 moves against the ramp surface 66a, the latch pivots in the direction indicated by the arrow 68, until the latch 66 catches the structure. For example, the latch 66 can cooperate with the stop 58 to hold the carrier 16 in the highway configuration when the stop 58 is moved against the latch 66 as indicated by the arrow 70 in FIG. 5.

If desired, the underbody latch 66 can be connected via a cable or wire (not shown) to the liftgate latch 62 shown in FIG. 1, such that operation of the liftgate latch 62 not only releases the catch 64 on the holder 20 when the carrier 16 is in the off-road configuration, but also releases the stop 58 when the carrier 16 is in the highway configuration. In either case, it will be appreciated that appropriate manipulation of the liftgate latch 62 releases the carrier 16 to move.

The operation of the carrier 16 can now be understood in cross-reference to FIGS. 1–4. With the carrier 16 initially in the highway configuration shown in FIG. 2, the carrier 16 can be released and slid rearwardly from beneath the vehicle 10 to an intermediate configuration shown in FIG. 3. Then, the thumbscrews 46 are manipulated to telescope the arms 38, 40 as shown in FIG. 4. Next, the carrier 16 is pivoted upwardly about the hinge bar 50, as indicated by the arrow 72 in FIG. 4, to the off-road configuration shown in FIG. 1. The carrier 16 can be moved back to the highway configuration by reversing the above steps.

While the particular SPARE TIRE STOWAGE SYSTEM FOR SPORT UTILITY VEHICLE as herein disclosed and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims.

We claim:

1. A system for stowing a spare tire on a vehicle, the system comprising:

a pair of guide rails adapted to be attached to an underside of the vehicle; and a carrier configured for holding the tire, said carrier having first and second legs each having a distal end interconnected to said pair of guide rails for pivotal movement about a common pivot axis, said carrier operable in a first position in which the spare tire is oriented generally horizontal and in a second position in which the spare tire is oriented generally vertical, said first and second legs also being slidably interconnected with said pair of guide rails;

wherein said carrier is linearly translatable relative to said pair of guide rails between said first position and an intermediate position; and wherein said carrier is upwardly pivotable about said common pivot axis between said intermediate position and said second position.

2. The system for stowing a spare tire of claim 1, wherein said carrier is generally U-shaped.

3. The system for stowing a spare tire of claim 1, wherein said first and second legs both include a pair of telescoping portions.

4. The system for stowing a spare tire of claim 1, wherein the carrier includes means for releasably engaging the vehicle in said first and second positions.

5. A vehicle comprising:

an underside;

a vertically oriented rear surface;

a pair of guide rails attached to said underside;

a spare tire; and a generally U-shaped carrier holding said spare tire, said carrier having first and second legs each having a distal end interconnected to said pair of guide rails for pivotal movement about a common pivot axis;

wherein said carrier is operable in a first position in which the spare tire is oriented generally horizontal and in a second position in which the spare tire is oriented generally vertical, said first and second ends further being slidably interconnected with said pair of guide rails;

wherein said carrier is linearly translatable relative to said pair of guide rails between said first position and an intermediate position; and wherein said carrier is upwardly pivotable about said common pivot axis between said intermediate position and said second position.

6. A vehicle of claim 5, wherein said first and second legs both include a pair of telescoping portions.

7. A vehicle comprising:

an underside;

a vertically oriented rear surface;

a pair of guide rails attached to said underside;

a spare tire; and a generally U-shaped carrier holding said spare tire, said carrier having first and second legs each having a distal end interconnected to said pair of guide rails for pivotal movement about a common pivot axis;

wherein said carrier is operable in a first position in which the spare tire is oriented generally horizontal and in a second position in which the spare tire is oriented generally vertical, said first and second ends further being slidably interconnected with said pair of guide rails;

wherein said carrier is upwardly pivotable about said common pivot axis between said intermediate position and said second position; and wherein said vehicle includes means for releasable engaging the carrier in said first and second positions.

8. A vehicle of claim 7, wherein said carrier is linearly translatable relative to said pair of guide rails between said first position and an intermediate position.

9. A vehicle of claim 7, wherein said first and second legs both include a pair of telescoping portions.

* * * * *